United States Patent
Gorman (10) Patent No.: US 9,623,356 B2
(45) Date of Patent: Apr. 18, 2017

(54) V-BANK FILTER ASSEMBLY WITH REPLACEABLE FILTERS

(71) Applicant: CAMFIL FARR, INC., Riverdale, NJ (US)

(72) Inventor: Joseph J. Gorman, Sussex, NJ (US)

(73) Assignee: CAMFIL USA, INC., Riverdale, NJ (US)

( * ) Notice: Subject to any disclaimer, the term of this patent is extended or adjusted under 35 U.S.C. 154(b) by 83 days.

(21) Appl. No.: 13/731,272

(22) Filed: Dec. 31, 2012

(65) Prior Publication Data

US 2013/0167493 A1    Jul. 4, 2013

Related U.S. Application Data

(60) Provisional application No. 61/582,422, filed on Jan. 2, 2012.

(51) Int. Cl.
*B01D 46/00* (2006.01)
*B01D 46/12* (2006.01)

(52) U.S. Cl.
CPC ....... *B01D 46/125* (2013.01); *B01D 46/0005* (2013.01); *B01D 46/008* (2013.01); *B01D 2201/28* (2013.01); *B01D 2265/024* (2013.01); *B01D 2271/02* (2013.01); *Y10T 29/4973* (2015.01)

(58) Field of Classification Search
CPC .... B01D 46/125; B01D 46/008; B01D 46/00; B01D 46/0005; B01D 2201/28; B01D 2265/024; B01D 2271/02; Y10T 29/4973
USPC ............... 55/482–519; 29/402.28, 402.08
See application file for complete search history.

(56) References Cited

U.S. PATENT DOCUMENTS

| 2,966,959 | A |   | 1/1961  | Nuemann |          |
|-----------|---|---|---------|---------|----------|
| 3,494,113 | A |   | 2/1970  | Kinney  |          |
| 3,707,046 | A | * | 12/1972 | De Baun | 55/483   |
| 5,223,011 | A | * | 6/1993  | Hanni   | 55/484   |

(Continued)

FOREIGN PATENT DOCUMENTS

| CA | 2826992 A1      | 7/2007  |
|----|-----------------|---------|
| JP | 1103331 A       | 2/1999  |
| WO | WO-00/59606 A1  | 10/2000 |

OTHER PUBLICATIONS

Farr, HVAC Products, Bulletin B-1306-15. RIGA-RP®, A totally new concept for today's fultration needs. © 1995 Farr Company.

(Continued)

*Primary Examiner* — T. Bennett McKenzie
(74) *Attorney, Agent, or Firm* — Patterson + Sheridan, LLP (57) ABSTRACT

A V-bank filter assembly and a replaceable air filter are provided. In one embodiment, the V-bank filter assembly includes a top panel and bottom panel coupled in a spaced apart relation, each of the top and bottom panels having a first edge and a second edge, a plurality of panel end seal struts extending between the top and bottom panels, each panel end seal struts having a first mating sealing feature facing the first edge of the top and bottom panels, the first mating sealing feature configured to sealingly engage a replaceable filter panel, wherein the plurality of panel end seal struts are located adjacent the second edge, and a plurality of filter panel receiving tracks defined between the top and bottom panels configured to align filter panels disposed in the tracks with a respective first mating sealing feature.

11 Claims, 5 Drawing Sheets

(56) References Cited

U.S. PATENT DOCUMENTS

| | | | |
|---|---|---|---|
| 5,512,074 | A | 4/1996 | Hanni et al. |
| 6,074,450 | A | 6/2000 | Raber |
| 6,485,538 | B1* | 11/2002 | Toyoshima ................... 55/490 |
| 2007/0169447 | A1 | 7/2007 | Osborne et al. |
| 2007/0169448 | A1* | 7/2007 | Osborne et al. ............... 55/484 |
| 2007/0199449 | A1* | 8/2007 | Wiser et al. ...................... 96/69 |
| 2009/0320426 | A1 | 12/2009 | Braunecker et al. |
| 2010/0326279 | A1 | 12/2010 | Wiser et al. |
| 2011/0277430 | A1* | 11/2011 | Nicholas ............ B01D 46/0005 55/483 |

OTHER PUBLICATIONS

Polyurethane, Epoxy and Silicone Thermoset Resin Systems for Encapsulants Coatings Adhesives Sealants Castings. Datasheet [online]. Greenfield Polymers. Oct. 27, 2010 [retrieved on Jul. 30, 2013]. Retrieved from the Internet: <URL: http://web.archive.org/web/20121024014108/http://www.greenfieldpolymers.co.uk/applications.asp?parent=&id=42.

International Search Report dated Jun. 17, 2013 for PCT Application No. PCT/US12/72267.

European Search Report for PCT/US2012/072267 dated Feb. 4, 2016 (9 pgs.).

Supplementary Partial European Search Report of PCT/US2012/072267 dated Sep. 10, 2015.

\* cited by examiner

V-BANK FILTER ASSEMBLY WITH REPLACEABLE FILTERS

CROSS-REFERENCE TO RELATED APPLICATIONS

This application claims benefit of U.S. Provisional Patent Application No. 61/582,422 filed on Jan. 2, 2012, which is incorporated by reference in entirety.

BACKGROUND

Field

The present invention relates to an air filter assembly having replaceable filters.

Description of the Related Art

V-bank filter assemblies are commonly used in air filtration applications where large amounts of filtration media are desirable, particularly in high flow, low pressure drop applications. A V-bank filter assembly typically includes a housing having two or more pairs of filter banks, where the filter banks further include two filter media elements, arranged in a V-configuration. The V-bank filter assembly is generally formed by applying a sealant between the edges of the filter media elements and the housing. In this manner, all of the filter media elements are connected to each other and to the housing. Therefore, during the fabrication or operation of the V-bank filter assembly, if a single filter media element is damaged, the housing and all of the filter media elements coupled to the housing must be replaced as a single unit. Replacing the entire V-bank filter assembly is undesirable because it increases the cost of manufacturing and the cost of ownership. Some V-bank filter assemblies have been designed with replaceable panels having individual filter media elements. However, these designs have not been commercially viable due to high material costs and/or significant air leakage between the filter media elements and housing rending the design unsatisfactory for many filtration applications.

Thus, there is a need for an improved V-bank filter assembly having replaceable filter media elements.

SUMMARY OF THE INVENTION

In one embodiment, a V-bank filter assembly includes a top panel and bottom panel coupled together in a spaced apart relation, and a plurality of panel end seal struts extending between the top and bottom panels. Each of the top and bottom panels has a first edge and a second edge. The plurality of panel end seal struts are located adjacent the second edge of the panels. Each of the panel end seal struts has a first mating sealing feature facing the first edge of the top and bottom panels. The first mating sealing feature is configured to sealingly engage a replaceable filter panel. A plurality of filter panel receiving tracks are defined between the top and bottom panels are configured to align filter panels disposed in the tracks with a respective first mating sealing feature.

In another embodiment, a V-bank filter assembly includes a top panel and bottom panel coupled together in a spaced apart relation, a plurality of panel side seal strut assemblies and a plurality of panel end seal struts extending between the top and bottom panels. Each of the top and bottom panels has a first edge and a second edge. The plurality of panel end seal struts are located adjacent the second edge of the panels. The panel side seal strut assemblies are disposed adjacent and offset from the first edge of the top panel. The plurality of panel side seal strut assemblies each include at least one second seal. A plurality of filter panel receiving tracks are disposed between the panels and configured to retain replaceable filter panels between the top and bottom panels in a v-shaped configuration. Each pair of filter panel receiving tracks align a respective filter panel with a respective first mating sealing feature of the panel end seal struts.

In one embodiment a replaceable air filter includes a replaceable air filter panel comprising a filter media element disposed in a frame. The frame has a first side, a second side, a third side and a fourth side circumscribing the filter media element. The sides are oriented perpendicular to the orientation of the filter media element. A mating sealing feature extends outward from an exterior of the fourth side of the frame and away from the filter media element.

In one embodiment, a method of replacing a filter panel of a filter housing is provided that includes removing a used filter panel from the filter housing and inserting a new filter panel into a tapered filter panel receiving rack of the filter housing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
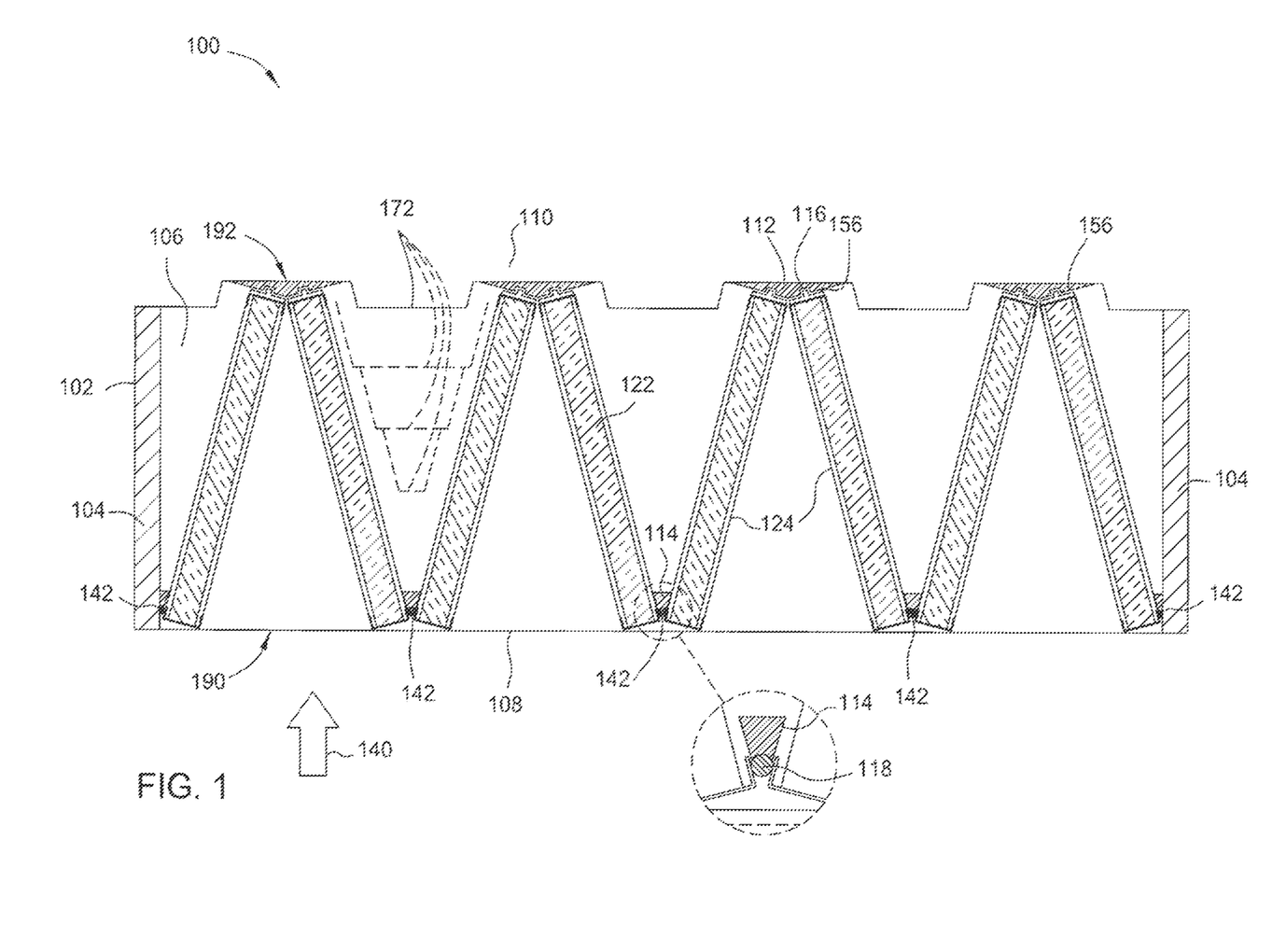
FIG. 1 is a cross-sectional view of a V-bank filter assembly with replaceable filter panels.

FIG. 1 is a cross-sectional view of one embodiment of a V-bank filter assembly 100. The V-bank filter assembly 100 includes a frame 102 and two or more replaceable filter panels 122, wherein at least two of the filter panels are arranged to form a v-bank 124. The V-bank filter assembly 100 include a first side 108 and a second side 110. In normal operation, air enters the V-bank filter assembly 100 from the first side 108, is filtered by the replaceable filter panels 122, then exits the V-bank filter assembly 100 from the second side 110, as indicated by flow arrow 140. Optionally, air may be filtered through the V-bank filter assembly 100 in the opposite direct.

The frame 102 includes a top panel 106, a bottom panel (not seen), two side panels 104, a plurality of panel end seal struts 112, and a plurality of panel side seal strut assemblies 142. The top and side panels 106, 104 may be fabricated from wood, plastic, glass reinforced plastic, metal or other suitable material. The top panel 106 includes a first edge 190 and a second edge 192, respectively disposed at the first side 108 and the second side 110 of the V-bank filter assembly 100. The top panel 106 may optionally have one or more cut-outs 172 (some shown in phantom) located proximate the second edge 192 of the top panel 106 between the panels 106 to reduce the amount of material used to fabricate the top panel 106, thereby minimizing costs and shipping weight. The bottom panel is identical to the top panel 106 and faces the top panel 106 in a mirror image orientation.

The two side panels 104 couple the top panel 106 and the bottom panel together in a spaced apart relation. The side panels 104 may extend completely from the first side 108 to the second side 110 of the V-bank filter assembly 100 so that the frame 102 takes a rectangular tubular form, thereby protecting the panels 106 disposed therein from inadvertent contact and damage. Alternatively, the side panels 104 may only extend a portion of the distance between the first side 108 to the second side 110 of the V-bank filter assembly 100 to minimize costs.

Figure 2:
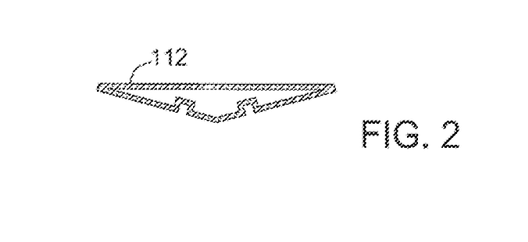
FIG. 2 is an enlarged cross-sectional view one embodiment of a panel end seal strut.

The panel end seal struts 112 also extend between the top panel 106 and bottom panel and are located proximate the second edge 192 of the top panel 106 and bottom panel defined at the second side 110 of the V-bank filter assembly 100. The panel end seal struts 112 are utilized to seal one end, such as the downstream end, of the filter panels 122 to the frame 102. The panel end seal struts 112 may be fabricated from wood, plastic, glass reinforced plastic, metal or other suitable material. In one embodiment, the panel end seal struts 112 are fabricated from stamped steel, extruded plastic or extruded aluminum. In another embodiment, the panel end seal struts 112 may be hollow, as shown in FIG. 2.

Figure 3:
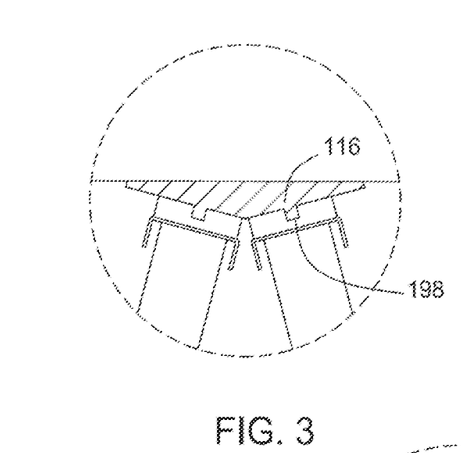
FIG. 3 is an enlarged partial cross-sectional view of the V-bank filter assembly of FIG. 1 illustrating another embodiment of a mating sealing feature.

Continuing to refer to FIG. 1, the panel end seal struts 112 include a first mating sealing feature 116 extending substantially along the entire length of the panel end seal struts 112, for example, from the facing surfaces of the top and bottom panels once assembled as part of the V-bank filter assembly 100. The first mating sealing feature 116 generally faces the second side 110 of the V-bank filter assembly 100. The first mating sealing feature 116 is configured to engage and substantially provide an air seal with a corresponding second mating sealing feature 156 disposed on one side of each to the filter panels 122, as further discussed below. In the embodiment depicted in FIG. 1, the first mating sealing feature 116 is a groove, and in one embodiment, the groove has a rectangular profile. In alternative embodiment depicted in FIG. 3, the first mating sealing feature 116 is a rib 198 that extends substantially along the entire length of the panel end seal struts 112, for example, from the facing surface of the top panel 106 and bottom panel. In embodiments where the first mating sealing feature 116 is in the form of a rib 198, the rib 198 may be an integral or separate element of the panel end seal strut 112. For example, the first mating sealing feature 116 in the form of a rib 198 may be an extruded section of the panel end seal strut 112 or may be bonded or otherwise affixed to the panel end seal strut 112. The first mating sealing feature 116 in the form of a rib 198 may fabricated from the same material as the panel end seal strut 112, or of a different material, such as a plastic or elastomer. In one embodiment, the first mating sealing feature 116 is in the form of a rib 198 may have a rectangular profile.

The plurality of panel side seal strut assemblies 142 also extend between the top panel 106 and bottom panel proximate the first side 108 of the V-bank filter assembly 100. Each panel side seal strut assembly 142 is located adjacent and offset from the first edge 190 of the top filter panel 106 and bottom panel defined at the first side 108 of the V-bank filter assembly 100. The panel side seal strut assemblies 142 are utilized to seal the opposite end, such as the upstream end, of the filter panel 122 to the frame 102.

The panel side seal strut assemblies 142 include a seal strut 114 and at least one seal 118. The seal strut 114 may be fabricated from wood, plastic, glass reinforced plastic, metal or other suitable material. In one embodiment, the seal strut 114 is fabricated from stamped steel, extruded plastic or extruded aluminum.

The seal 118 is mounted adjacent to the seal strut 114 at a side of the seal strut 114 closer to the first edge 190 of the top panel 106 and runs substantially the entire length of the panel side seal strut assembly 142, for example, from the facing surfaces of the top panel 106 and bottom panel. The seal 118 may be fabricated from an elastomer, may be adhered, bonded or formed in place in the seal strut 114. The seal 118 is utilized to provide an air seal between the seal strut 114 and adjacent filter panel 122. The air seal may be substantially leak free, or have a certain amount of allowable by-pass depending on the intended use of the V-bank filter assembly 100. In one embodiment, one seal 118 may be utilized to seal both filter panels 122 adjacent either side of the seal strut 114. In another embodiment, at least two seals 118 are utilized to seal the seal strut 114 to the filter panels 122, with at least one seal 118 providing a seal between the seal strut 114 and the filter panel 122 adjacent the first side of the seal strut 114 and at least one seal 118 providing a seal between the seal strut 114 and the filter panel 122 adjacent the second side of the seal strut 114.

Figure 4:
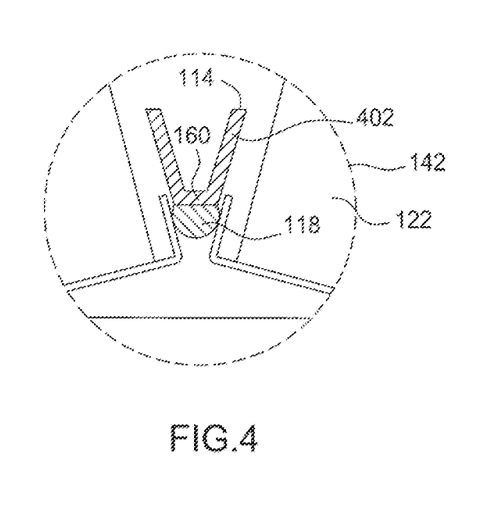
FIG. 4 is an enlarged partial cross-sectional view of the V-bank filter assembly of FIG. 1 illustrating one embodiment of a panel side seal strut assembly.
Figure 5:
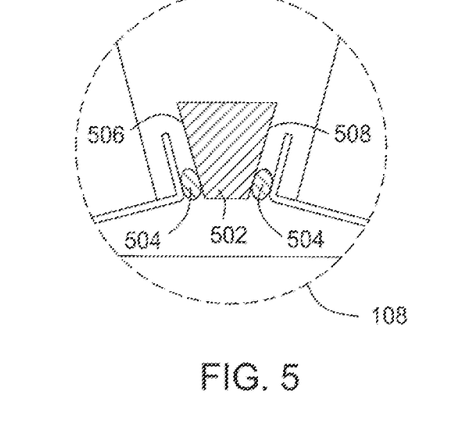
FIG. 5 is an enlarged partial cross-sectional view of the V-bank filter assembly of FIG. 1 illustrating another embodiment of a panel side seal strut assembly.

For example in the embodiment depicted in FIG. 4, the panel side seal strut assembly 142 includes a seal strut 114 having a v-Shaped body 402. The v-shaped body 402 includes a flat land 160 at the vertices of the body 402 to which the seal 118 is mounted. The seal 118 provides a seal against the facing sides of the filter panels 122 adjacent the seal strut 114. In another example depicted in the embodiment of FIG. 5, panel side seal strut assembly is in the form of a strut 502 having two seals 504. The strut 502 has a first side 506 and a second side 508 which are oriented at an acute angle flaring away from the first side 108 of the V-bank filter assembly 100. The one of the two seals 504 is mounted to the first side 506 while one of the two seals 504 is mounted to the second side 508.

It is contemplated that the panel side seal strut assembly 142 may optionally be omitted, and that the filter panels 122 may have gaskets to enable adjacent filter panels 122 to seal to each other. Alternatively, the adjacent filter panels 122 may seal to each other using other means, such as tapes, clamps or adhesives.

Figure 6:
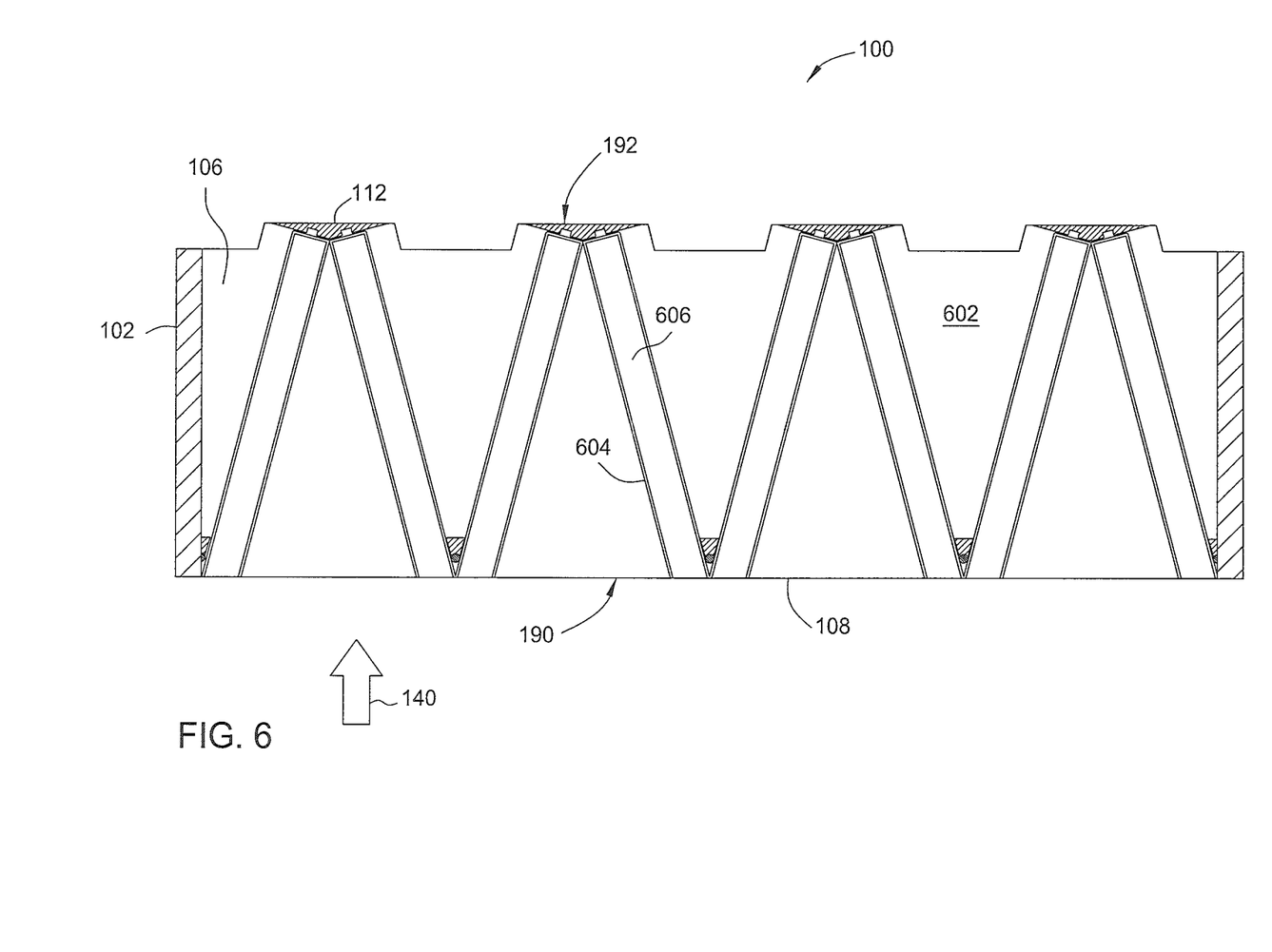
FIG. 6 is a cross sectional view of the V-bank filter assembly of FIG. 1 with the replaceable filter panels removed.

FIG. 6 is a cross sectional view of the V-bank filter assembly 100 of FIG. 1 with the filter panels 122 removed exposing an inside surface 602 of the top panel 106. The bottom panel is identically constructed as discussed above. The inside surface 602 of the top panel 106 includes a plurality of filter panel receiving tracks 604. The tracks 604 are arranged at an acute angle relative to the flow direction as shown by arrow 140, which is also perpendicular to the first side 108 of the V-bank filter assembly 100. Each track 604 defines a recess 606 which is configured to receive one side of the filter panels 122. The recess 606 may be defined by a groove formed in the inside surface 602 of the top panel 106, by ridges extending from the inside surface 602 of the top panel 106, or a combination thereof. The tracks 604 may alternatively be coupled to the inside surface 602 of the top panel 106 in a multi-piece construction. The tracks 604 hold the filter panels 122 in a "V-shaped" configuration within the frame 102.

The recess 606 of each track 604 is open at the first edge 190 of the top panel 106 to allow the filter panel 122 to slide into the aligned and opposing recesses 606 disposed on the top panel 106 and bottom panel of the V-bank filter assembly 100. The recess 606 of each track 604 ends at the panel end seal struts 112. The recess 606 of the track 604 advantageously allows for the filter panel 122 (not shown) to be slid into sealing engagement with the panel end seal strut 112.

In one embodiment, the lateral width of the track 604 is tapered towards the second edge 192 of the top panel 106 and bottom panel of the V-bank filter assembly 100. Due to the taper of the track 604, the filter panel 122 may be secured by friction within the frame 102 without the use of a fastener, clip or other fastening device. Furthermore, the track 604 allows a single filter panel 122 to be replaced by sliding the filter panel 122 in and out of the track 604 without disturbing the seal between the other filter panels 122 and the frame 102. Thus, the track 604 allows a single filter panel 122 to be easily replaced without having to replace the entire V-bank filter assembly.

Figure 7:
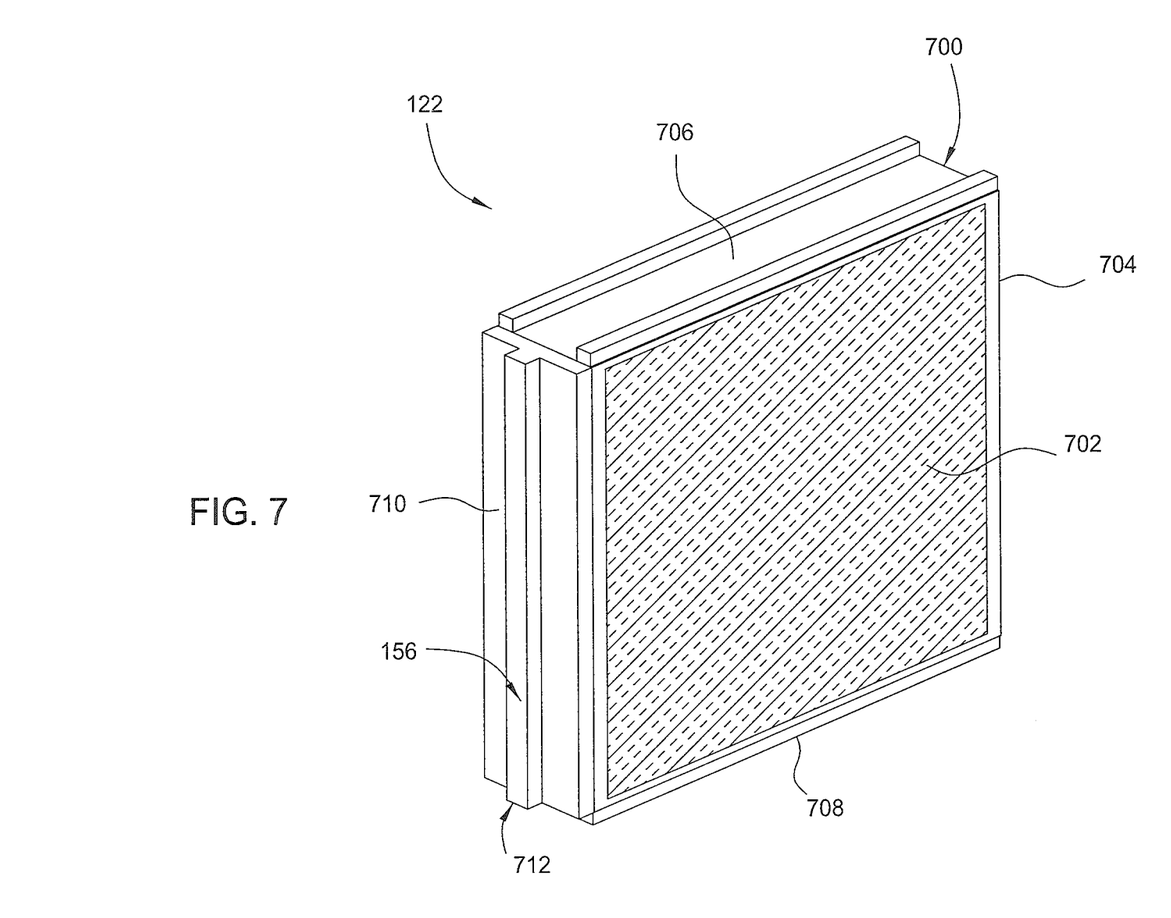
FIG. 7 is a perspective view of one embodiment of a replaceable filter panel.

FIG. 7 depicts one embodiment of the replaceable filter panel 122. It is contemplated that the filter panel 122 may be configured differently and not limited in use for only V-bank filter assemblies. The replaceable filter panel 122 includes a frame 700 and a filter media element 702. The filter media element 702 is retained in the frame 700, and in some embodiments, may be sealed to the frame 700 using polyurethane or other suitable adhesives. The filter media element 702 may be a woven, non-woven or other suitable filtration element. The filter media element 702 is pleated to increase the amount of filtration media present in the filter panel 122. The filter media element 702 may have a MERV, ASHRAE or other efficiency rating.

The frame 700 may be fabricated from metal, plastic, wood, cardboard or other suitable material. The frame 700 is generally a quadrilateral and includes a first side 704, a second side 706, a third side 708 and a fourth side 710. The sides 704, 706, 708, 710 have an orientation perpendicular to the planar orientation of the filter media element 702. Each of the sides 704, 706, 708, 710 may include two flanges 714 extending inward and perpendicular from each side 704, 706, 708, 710. The flanges 714 form a c-channel with the sides 704, 706, 708, 710 thereby facilitating the retention of the filter media element 702 within the frame 700 and retaining adhesive used to provide a seal between the filter media element 702 and the frame 700. The flanges 714 also provide a continuous flat surface for engaging the seals 118, thereby sealing the fourth side 710 of the filter panel 122 to the frame 102 of the V-bank filter assembly 100.

Figure 8:
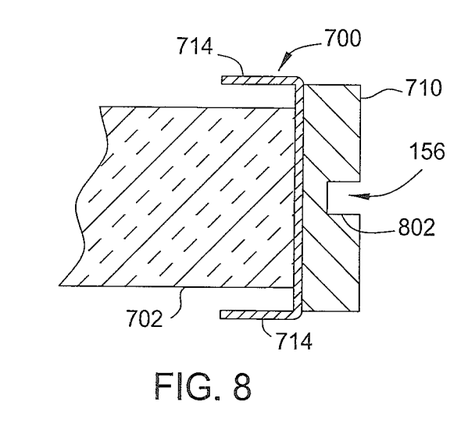
FIG. 8 is partial cross-sectional view on another embodiment of a replaceable filter panel.

The first side 704 is generally perpendicular to the plane of the top panel 106. In one embodiment the first side 704 of the frame 700 does not include any sealing features. The second side 706 and the third side 708 are sized to fit within the recess 606 of the track 604. The fourth side 710 of the frame 700 includes the second mating sealing feature 156 which engages first mating sealing feature 116 when the filter panel 122 is slid completely within the recess 606 of the track 604. In the embodiment depicted in FIG. 7, the first mating sealing feature 116 is in the form of a rib 712. In the embodiment depicted in FIG. 8, the second mating sealing feature 156 is in the form of a groove 802.

Figure 9:
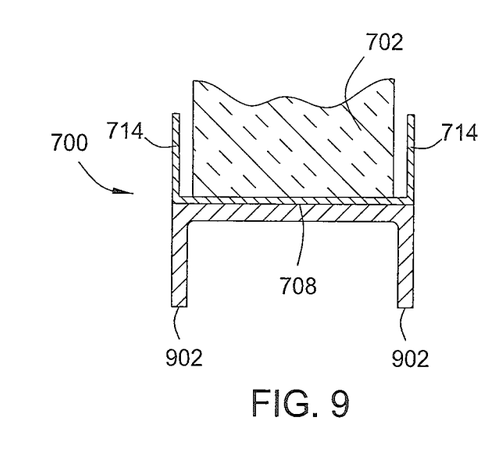
FIG. 9 a partial cross-sectional view of the another embodiment of a replaceable filter panel.

Referring now to FIG. 9, to enhance the retention of the filter panel 122 within the track 604, the third side 708 may include two lips 902 extending from the third side 708. The second side 706 may be identically configured. The lips 902 allow the filter panel 122 to be sealingly fit within the recess 606. The lips 902 may be parallel, tapered to match the tapering of the recess 606, or taped as a wider angle than the taper of the recess 606 to ensure an interference fit with the top and bottom panels to promote retention and sealing. In one embodiment, the lips 902 may be formed from a resilient material or structure that allows the filter panel 122 to be sealingly fit within the recess 606. In another embodiment, the lips 902 may be formed from the same material as the third side 708. The lips 902 may be formed integrally with the third side 708 as a single element, or the lips 902 may be a separate element affixed to the third side 708.

Figure 10:
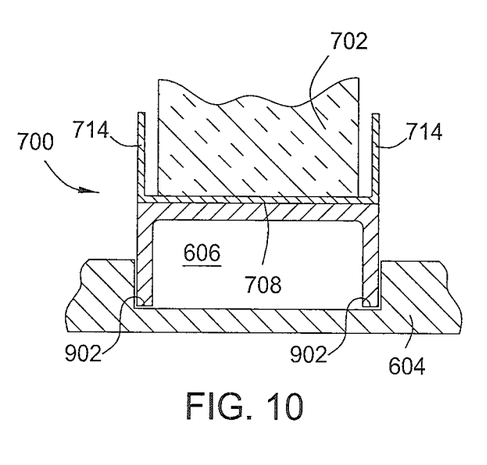
FIG. 10 is a partial cross-sectional view of the V-bank filter assembly of FIG. 1 engaged with another embodiment of a replaceable filter panel.

Referring to FIG. 10, the lips 902 may begin to slightly deflect as the filter panel 122 is pushed deeper within the track 604, thereby friction fitting the filter panel 122 within the recess 606 while also providing an air seal between the filter panel 122 and the frame 102.

Figure 11:
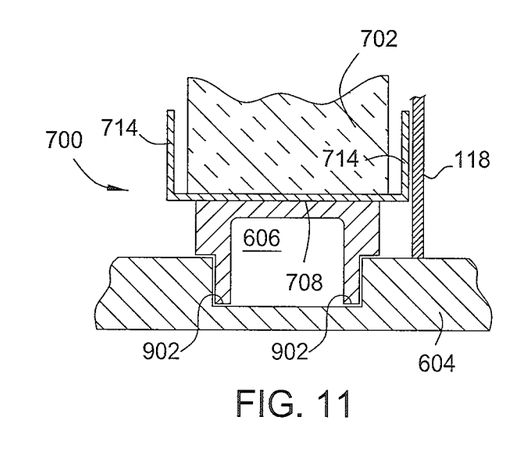
FIG. 11 is a partial cross-sectional view of the V-bank filter assembly of FIG. 1 engaged with another embodiment of a replaceable filter panel.

In another embodiment, shown in FIG. 11, the third side 708 has a width that extends beyond a width of the tapered track 604. The lips 902 are therefore positioned inward of the flanges 714 to engage with the recess 606 of the tapered track 604.

Thus, a V-bank filter assembly 100 has been provided that allows fast and easy fabrication with replaceable filter panels 122. The filter panels advantageously allows replacement without having to remove or discard the entire V-bank filter assembly 100 either during fabrication or during operation of the V-bank filter assembly 100.

It is contemplated, however, that the filter panel receiving tracks discussed above are not limited to V-bank filter assemblies only and may be applicable for sealing other filter elements or filter headers in a filter housing assembly.

While the foregoing is directed to embodiments of the present disclosure, other and further embodiments of the disclosure may be devised without departing from the basic scope thereof, and the scope thereof is determined by the claims that follow.

What is claimed is:
1. A V-bank air filter assembly comprising:
   a top panel and bottom panel coupled in a spaced apart relation, each of the top and bottom panels having a first edge and a second edge;
   a plurality of filter panel receiving tracks disposed on the top and bottom panels and oriented to align replaceable filter panels disposed in the filter panel receiving tracks, wherein each of the tracks has a recess tapered towards the second edge of the top panel;

a plurality of panel end seal struts, each panel end seal strut extending from the top panel to the bottom panel and having a face extending perpendicularly across the filter panel receiving tracks, wherein the face is oriented to abut an end face of a respective filter panel disposed in the filter panel receiving tracks, wherein the plurality of panel end seal struts are located adjacent the second edge; and a first mating sealing feature recessed inward from or extending outward from the face of the panel end sealing strut, the first mating sealing feature facing the first edge of the top and bottom panels, wherein the first mating sealing feature is aligned within the bounds of the receiving tracks and is oriented to continuously abut and sealingly engage an end face of a replaceable filter panel.

2. The V-bank air filter assembly of claim 1, wherein the first mating sealing feature is a rib.

3. The V-bank air filter assembly of claim 1, wherein the first mating sealing feature is a groove.

4. The V-bank air filter assembly of claim 1 further comprising:
a plurality of panel side seal strut assemblies each comprising at least one second seal, the panel side seal strut assemblies disposed adjacent and offset from the first edge of the top panel.

5. The V-bank air filter assembly of claim 1, wherein the first mating sealing feature comprises at least one of a male or female connection.

6. The V-bank air filter assembly of claim 5, wherein the first mating sealing feature is integrally formed with each panel end seal strut.

7. The V-bank air filter assembly of claim 1, wherein the recess in each of the tracks is configured for receiving the filter panels.

8. The V-bank air filter assembly of claim 1, wherein the first mating sealing feature of the panel end seal strut is configured to engage a corresponding second mating sealing feature on one end face of the filter panel.

9. A V-bank air filter assembly comprising:
a top panel and bottom panel coupled in a spaced apart relation, each of the top and bottom panels having a first edge and a second edge;

a plurality of panel end seal struts, each panel end seal struts strut extending from the top panel to the bottom panel, wherein the plurality of panel end seal struts are located adjacent the second edge;

a plurality of panel side seal strut assemblies each comprising at least one second seal, the panel side seal strut assemblies disposed adjacent and offset from the first edge of the top panel; and a plurality of filter panel receiving tracks disposed on the top and bottom panels and configured to retain replaceable filter panels between the top and bottom panels in a v-shaped configuration, each pair of filter panel receiving tracks aligning a respective filter panel with a respective first mating sealing feature of the panel end seal struts, wherein each of the filter panel receiving tracks has a recess tapered towards the second edge of the top panel.

10. The V-bank air filter assembly of claim 9, wherein the first mating sealing feature is a rib.

11. The V-bank air filter assembly of claim 9, wherein the first mating sealing feature is a groove.

* * * * *

UNITED STATES PATENT AND TRADEMARK OFFICE
CERTIFICATE OF CORRECTION

PATENT NO. : 9,623,356 B2
APPLICATION NO. : 13/731272
DATED : April 18, 2017
INVENTOR(S) : Gorman Page 1 of 1

It is certified that error appears in the above-identified patent and that said Letters Patent is hereby corrected as shown below:

In Column 8, Line 13, in Claim 9, delete "struts strut" and insert -- strut --, therefor.

Signed and Sealed this
Tenth Day of July, 2018

Andrei Iancu
*Director of the United States Patent and Trademark Office*